(12) United States Patent
Nakashima

(10) Patent No.: US 11,624,301 B2
(45) Date of Patent: Apr. 11, 2023

(54) CONTROLLER, VEHICLE, STORAGE MEDIUM, AND OPERATION METHOD OF CONTROLLER

(71) Applicant: TOYOTA JIDOSHA KABUSHIKI KAISHA, Toyota (JP)

(72) Inventor: Toyokazu Nakashima, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/478,286

(22) Filed: Sep. 17, 2021

(65) Prior Publication Data

US 2022/0172526 A1 Jun. 2, 2022

(30) Foreign Application Priority Data

Nov. 30, 2020 (JP) .............................. JP2020-199038

(51) Int. Cl.
| | |
|---|---|
| *F01M 11/12* | (2006.01) |
| *F01M 11/10* | (2006.01) |
| *G07C 5/08* | (2006.01) |
| *F01M 11/04* | (2006.01) |
| *B60S 5/00* | (2006.01) |

(52) U.S. Cl.
CPC ............ *F01M 11/12* (2013.01); *F01M 11/04* (2013.01); *F01M 11/10* (2013.01); *G07C 5/085* (2013.01); *B60S 5/00* (2013.01); *F01M 2011/1453* (2013.01); *F16N 2260/04* (2013.01)

(58) Field of Classification Search
None
See application file for complete search history.

(56) References Cited

U.S. PATENT DOCUMENTS

| | | | | |
|---|---|---|---|---|
| 4,706,193 A | * | 11/1987 | Imajo .................... | G07C 5/006 701/29.5 |
| 6,917,865 B2 | * | 7/2005 | Arai ....................... | F01M 11/10 701/29.5 |
| 6,977,583 B2 | * | 12/2005 | Gornick ................ | F01M 11/10 340/451 |
| 7,900,507 B2 | * | 3/2011 | Kauffman .......... | G01M 15/042 73/114.55 |

(Continued)

FOREIGN PATENT DOCUMENTS

| | | | | | |
|---|---|---|---|---|---|
| CN | 109184853 A | * | 1/2019 | ......... | F01M 11/0458 |
| CN | 106801636 B | * | 4/2019 | | |

(Continued)

OTHER PUBLICATIONS

Combine Russian Federation Office Action and Search Report dated Feb. 16, 2022 in Russian Federation Patent Application No. 2021127487/11(058043) (submitting English translation only), 7 pages.

*Primary Examiner* — Kevin R Steckbauer
(74) *Attorney, Agent, or Firm* — Oblon, McClelland, Maier & Neustadt, L.L.P.

(57) ABSTRACT

A controller includes: a control unit configured to detect, based on information from a sensor mounted on a vehicle, a first event indicating that engine oil is discharged from an engine of the vehicle, or a second event indicating that the engine is replenished with engine oil; and a storage unit configured to store the result of detection by the control unit as a history of oil change.

18 Claims, 6 Drawing Sheets

(56) References Cited

U.S. PATENT DOCUMENTS

| | | | |
|---|---|---|---|
| 8,126,607 B2* | 2/2012 | Boss | G01M 17/007 |
| | | | 701/33.4 |
| 8,746,408 B2* | 6/2014 | Albertson | F01M 11/10 |
| | | | 701/29.5 |
| 9,984,514 B2* | 5/2018 | Helm | G05B 23/0283 |
| 10,573,094 B2* | 2/2020 | Abuelsaad | G07C 5/0858 |
| 11,373,463 B2* | 6/2022 | Abuelsaad | G07C 5/0858 |
| 2004/0059542 A1 | 3/2004 | Apostolides | |
| 2004/0093150 A1* | 5/2004 | Arai | F01M 11/10 |
| | | | 701/104 |
| 2008/0093172 A1* | 4/2008 | Albertson | F01M 11/10 |
| | | | 701/31.4 |
| 2010/0114417 A1* | 5/2010 | Boss | G07C 5/085 |
| | | | 701/31.4 |
| 2012/0046920 A1* | 2/2012 | Blossfeld | F01M 1/18 |
| | | | 703/2 |
| 2017/0221284 A1* | 8/2017 | Helm | G07C 5/0825 |
| 2018/0308294 A1* | 10/2018 | Abuelsaad | G07C 5/0858 |
| 2020/0013240 A1* | 1/2020 | Abuelsaad | F01M 11/12 |
| 2022/0172526 A1* | 6/2022 | Nakashima | F01M 11/04 |

FOREIGN PATENT DOCUMENTS

| | | | | | |
|---|---|---|---|---|---|
| CN | 208871320 | U | * | 5/2019 | |
| CN | 208871320 | U | | 5/2019 | |
| CN | 106927416 | B | * | 8/2019 | ............. B67D 7/06 |
| CN | 110173324 | A | * | 8/2019 | |
| CN | 111042893 | A | | 4/2020 | |
| CN | 111664905 | A | * | 9/2020 | |
| EP | 191458 | A | * | 8/1986 | ............. F01M 11/10 |
| EP | 4006318 | A1 | * | 6/2022 | ............. F01M 11/10 |
| FR | 2961252 | A1 | * | 12/2011 | ............. F01M 1/18 |
| JP | 61-272410 | A | | 12/1986 | |
| JP | 61272410 | A | * | 12/1986 | ............. F01M 11/10 |
| JP | 5-171911 | A | | 7/1993 | |
| JP | 2004-522888 | A | | 7/2004 | |
| JP | 4076076 | B2 | * | 4/2008 | ............. F01M 11/10 |
| JP | 2011-196220 | A | | 10/2011 | |
| JP | 2020-144587 | A | | 9/2020 | |
| JP | 2021116755 | A | * | 8/2021 | |
| JP | 2022086813 | A | * | 6/2022 | ............. F01M 11/10 |
| WO | WO 02/42118 | A2 | | 5/2002 | |

* cited by examiner

CONTROLLER, VEHICLE, STORAGE MEDIUM, AND OPERATION METHOD OF CONTROLLER

CROSS-REFERENCE TO RELATED APPLICATION

This application claims priority to Japanese Patent Application No. 2020-199038 filed on Nov. 30, 2020, incorporated herein by reference in its entirety.

BACKGROUND

1. Technical Field

The present disclosure relates to a controller, a vehicle, a storage medium, and an operation method of the controller.

2. Description of Related Art

In order to maintain vehicles in good condition to ensure resale value of the vehicles, regular maintenance of each part of the vehicles is required. The maintenance includes inspection of operation, and replacement and replenishment of consumables. Various techniques have been proposed to assist vehicle maintenance. For example, Japanese Unexamined Patent Application Publication (Translation of PCT application) No. 2004-522888 discloses a device that measures oil pressure of an engine to determine whether an oil filter is replaced.

SUMMARY

In the case of vehicles operated by an internal combustion engine, it is desirable to have a history of maintenance, for example, a history of executing oil change, in order to maintain the resale value of the vehicles.

Hereinafter, a controller or the like to support management of the history of oil change will be disclosed.

A first aspect of the present disclosure relates to a controller. The controller includes a control unit and a storage unit. The control unit is configured to determine an execution of oil change when detecting, based on information from a sensor mounted on a vehicle, a first event indicating that engine oil is discharged from an engine of the vehicle, or a second event indicating that the engine is replenished with engine oil. The storage unit is configured to store the result of detection by the control unit as a history of oil change.

A second aspect of the present disclosure relates to a vehicle. The vehicle includes the controller according to the first aspect.

A third aspect of the present disclosure relates to a non-transitory storage medium. The non-transitory storage medium stores commands that are executable by one or more processors and that cause the one or more processors to perform functions. The functions include causing a computer to operate as the controller according to the first aspect.

A fourth aspect of the present disclosure relates to an operation method of a controller. The operation method includes: receiving information from devices including a sensor mounted on a vehicle; and storing a result of detection as a history of oil change when detecting, based on the information, a first event indicating that engine oil is discharged from an engine of the vehicle or a second event indicating that the engine is replenished with engine oil.

The aspects of the present disclosure make it possible to support management of a history of oil change.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments will be described.

Figure 1:
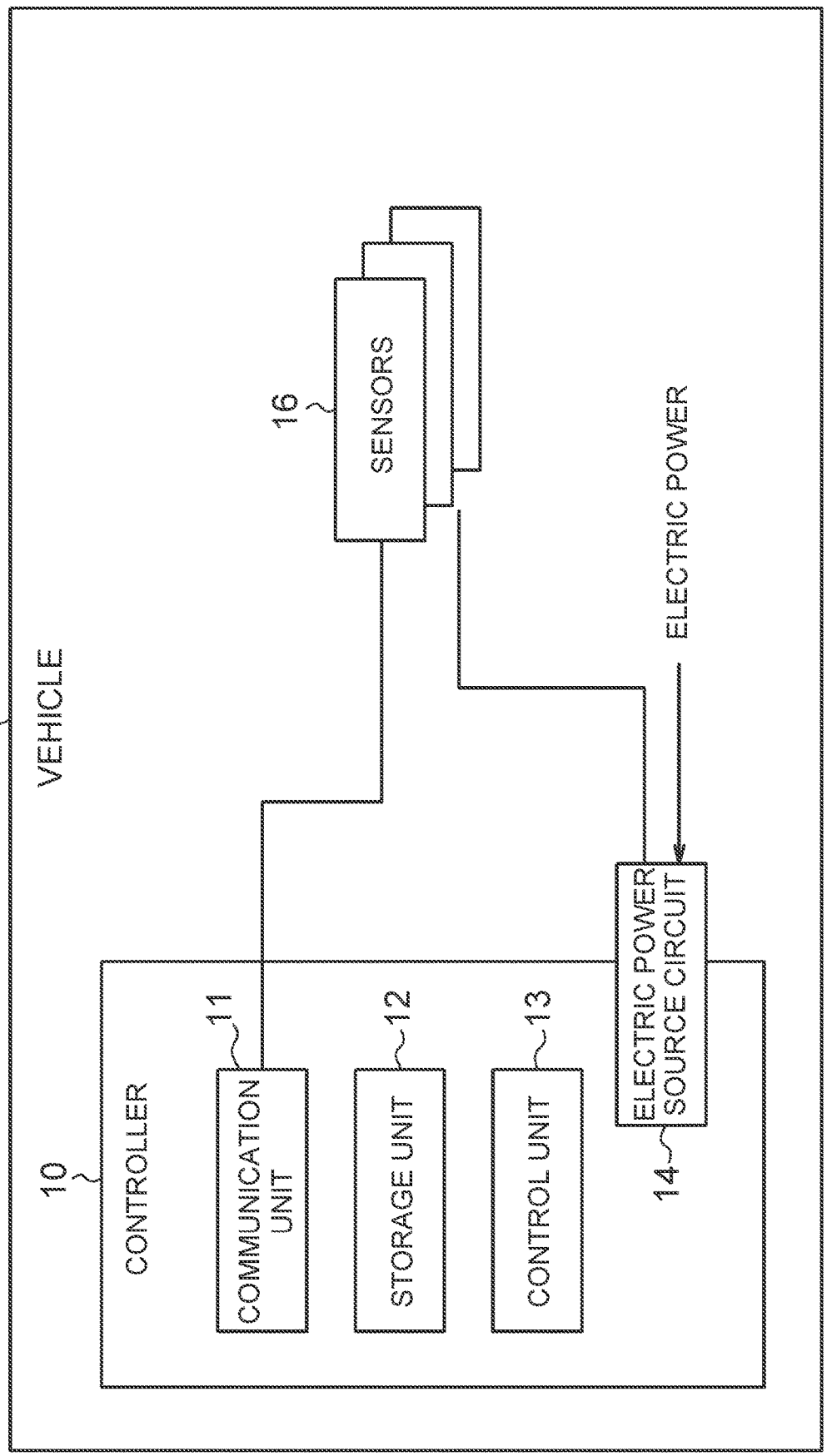
FIG. 1 shows a configuration example of a controller.

FIG. 1 shows a configuration example of a controller in an embodiment. A controller 10 is an information processing device mounted on a vehicle 1 operated by an internal combustion engine. The controller 10 is communicably connected to various sensors 16 mounted on various places of the vehicle 1 and to other onboard equipment. For example, the controller 10 is an electronic control unit (ECU) that is connected to the sensors 16 and other onboard equipment through an in-vehicle network that conforms to standards such as a controller area network (CAN) standard. The controller 10 may be an information terminal device, such as navigation devices, smartphones, tablet terminal devices, and personal computers, having a communication interface supporting the in-vehicle network. The sensors 16 include an oil level sensor to detect a remaining amount of engine oil, a suspension sensor to detect an extension amount of a suspension, and a hood sensor to detect when the hood is opened or closed. The controller 10 operates upon reception of electric power from a vehicle battery via an electric power source circuit 14. The electric power source circuit 14 may be incorporated in the controller 10 or may be provided outside the controller 10. The electric power source circuit 14 is configured to supply electric power to the controller 10 in response to a signal sent from the hood sensor to indicate that the vehicle hood is opened. Even when the ignition of the vehicle 1 is in an off state, the controller 10 is configured to be started so as to be operable with the electric power supplied via the electric power source circuit 14 when the hood is opened.

The controller 10 includes a communication unit 11, a control unit 13, and a storage unit 12. The communication unit 11 receives information from equipment including the sensors 16 mounted on the vehicle 1. The control unit 13 determines, based on the information received by the communication unit 11, whether oil change is executed when a first event indicating that engine oil is discharged from an engine of the vehicle 1 (hereinafter referred to as a discharge indication event for convenience) and a second event indicating that the engine is replenished with engine oil (hereinafter, referred to as a replenishment indication event for convenience) are detected. The storage unit 12 stores the history of oil change.

The change of engine oil for the vehicle 1 is executed in various ways. For example, oil change is executed in facilities of a sales agent of the vehicle 1 by a worker of the sales agent. In this case, the worker in the sales agent can keep track of the history of oil change for the vehicle 1. Alternatively, oil change may be executed by a third party worker at a third party service facility, or by a user of the vehicle 1 at the user's home or the like. In these cases, it is difficult for the sales agent to keep track of the history of oil change for the vehicle 1. Meanwhile, the oil level sensor, which is standard equipment of the vehicle 1, can detect a momentary value of the remaining amount of oil, though it is hard to detect whether oil change, that is, discharge and replenishment of oil, is executed based on the remaining amount of the oil. The controller 10 of the present embodiment stores the history of oil change by detecting at least one of the discharge indication event that indicates oil discharge at a high probability and the replenishment indication event that indicates oil replenishment at a high probability. The controller 10 of the present embodiment can support management of the history of oil change without the need for additional component members for directly detecting one of oil discharge and oil replenishment. Specific examples of the discharge indication event and the replenishment indication event will be described in detail below.

Description is now given of each unit of the controller 10.

The communication unit 11 has a communication module that conforms to one or more wired or wireless standards used for connecting to an in-vehicle network of the vehicle 1. The communication unit 11 is connected to the in-vehicle network through a communication module that conforms to standards such as controller area network (CAN) standards. The communication unit 11 receives information indicating detection results from the sensors 16 of the vehicle 1 and transfers the information to the control unit 13. The communication unit 11 also includes one or more global navigation satellite system (GNSS) receivers or a communication module that can communicate with the GNSS receivers. The GNSS includes, for example, at least one of global positioning system (GPS), quasi-zenith satellite system (QZSS), BeiDou, global navigation satellite system (GLONASS), and Galileo. The communication unit 11 receives GNSS signals, and transfers the signals to the control unit 13.

The storage unit 12 include a semiconductor memory, a magnetic memory, or an optical memory. For example, the storage unit 12 functions as a main storage, an auxiliary storage, or a cache memory. The storage unit 12 stores any information that is used for operation of the control unit 13, such as control and processing programs that are commands for causing the controller 10 to execute control and processing functions. The storage unit 12 also stores the history of oil change determined by the control unit 13.

The control unit 13 includes one or more general-purpose processors, such as central processing units (CPUs), or one or more specialized processors specialized in specific processing. Alternatively, the control unit 13 may include one or more dedicated circuits such as field-programmable gate arrays (FPGAs), and application specific integrated circuits (ASICs). The control unit 13 executes the operations according to the present embodiment by operating in accordance with the control and processing programs or by operating according to operation procedures that are implemented as a circuit. The control unit 13 determines whether oil change is executed by, for example, acquiring information from the sensors 16 of the vehicle 1 via the communication unit 11 or by detecting the current position of the vehicle 1 upon reception of GNSS signals.

Figure 2:
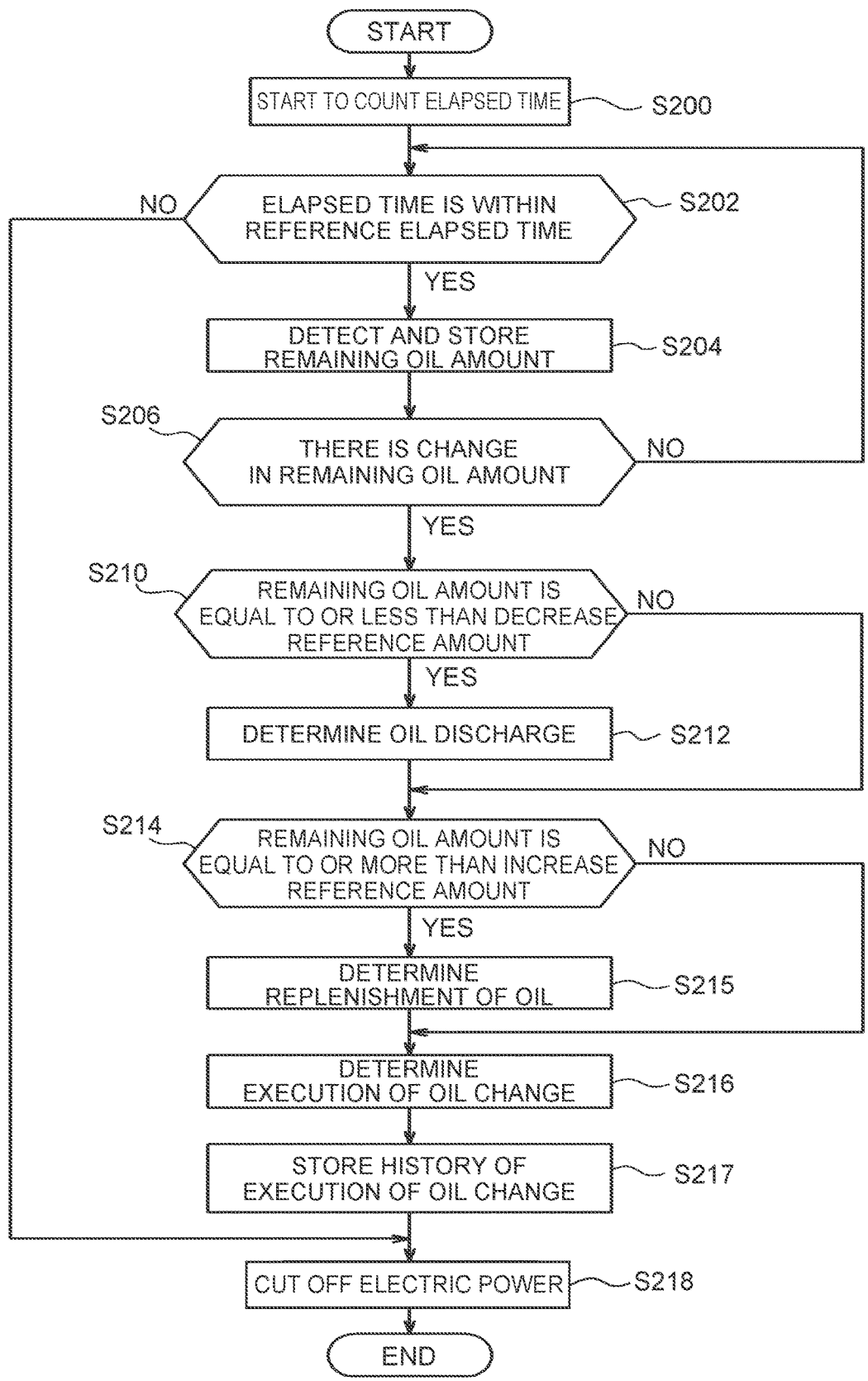
FIG. 2 is a flowchart describing an example of operation procedures of the controller.

FIG. 2 is a flowchart describing an example of the operation procedures of the controller 10 in the present embodiment. The operating procedures in FIG. 2 are carried out by the control unit 13, when the electric power source circuit 14 supplies electric power to the controller 10 upon reception of a signal indicating that the hood is opened from the hood sensor, and thereby the controller 10 is started. The procedures in FIG. 2 are the procedures in the case of determining that oil change is executed by detecting a decrease in remaining oil amount as a discharge indication event and detecting an increase in remaining oil amount as a replenishment indication event.

In step S200, the control unit 13 starts to count elapsed time. Then, when the elapsed time is within reference elapsed time (Yes in step S202), the control unit 13 proceeds to step S204. The reference elapsed time is typically the time required for oil change operation. The reference elapsed time is preset and stored in the storage unit 12. When the elapsed time exceeds the reference elapsed time (No in step S202), the control unit 13 proceeds to step S218. In step S218, the control unit 13 cuts off electric power to the controller 10, and ends the procedures in FIG. 2.

In step S204, the control unit 13 detects the remaining oil amount, and stores it in the storage unit 12. The control unit 13 detects the remaining oil amount based on information received from the oil level sensor via the communication unit 11 and stores information on the detected remaining oil amount in the storage unit 12. Then, when it is determined that there is change in remaining oil amount (Yes in step S206), the control unit 13 proceeds to step S210. For example, the control unit 13 calculates a difference corresponding to any elapsed time from the information on the remaining oil amount stored in the storage unit 12. When the difference is equal to or more than a reference amount that is optionally set in advance, the control unit 13 determines that there is change in remaining oil amount. When the difference is less than the reference amount, the control unit 13 determines that there is no change in remaining oil amount. When it is determined that there is no change in remaining oil amount (No in step S206), the control unit 13 returns to step S202.

In step S210, the control unit 13 determines whether the remaining oil amount is equal to or less than a decrease reference amount. The decrease reference amount is a reference amount indicating that there is a high probability that an oil tank is empty or close to empty when the remaining oil amount is equal to or less than the pertinent amount. For example, the decrease reference amount is set to values close to a lower limit of the remaining oil amount that can be detected. When the remaining oil amount is equal to or less than the decrease reference amount (Yes in step S210), the control unit 13 proceeds to step S212. In step S212, the control unit 13 determines that oil is discharged, and proceeds to step S214. When the remaining oil amount is above the decrease reference amount (No in step S210), the control unit 13 proceeds to step S214 without executing step S212.

When it is determined that oil is discharged, the control unit 13 determines in step S214 whether the remaining oil amount is equal to or more than an increase reference amount. The increase reference amount is a reference amount indicating that there is a high probability that the oil tank is replenished with oil when the remaining oil amount reaches the pertinent amount. The increase reference amount is optionally set. The increase reference amount may be identical to or different from the decrease reference amount. When the remaining oil amount is equal to or more than the increase reference amount (Yes in step S214), the control unit 13 proceeds to step S215. In step S215, the control unit 13 determines that oil is replenished, and proceeds to step S216. When the remaining oil amount is below the increase reference amount (No in step S214), the control unit 13 proceeds to step S216 without executing step S215.

In step S216, when the remaining oil amount decreases below the decrease reference amount, that is, when the discharge indication event indicating that oil is discharged with a high probability is detected, or when the remaining oil amount increases beyond the increase reference amount, that is, when the replenishment indication event indicating that oil is replenished with a high probability is detected, the control unit 13 determines that oil change is executed. Alternatively, when it is detected that the remaining oil amount decreases below the decrease reference amount and then the remaining oil amount recovers to the increase reference amount or higher, that is, when both the discharge indication event and the replenishment indication event are detected, the control unit 13 determines that oil change is executed, and creates information that is weighted with the certainty of execution of oil change. In this case, the oil change is indicated with a higher probability than when each event is detected solely. For example, the information weighted with the certainty of execution of oil change is a score, or the like, indicating the certainty in numerical magnitude. Then, in step S217, the control unit 13 stores in the storage unit 12 the history of oil change, or the information indicating the weighted certainty in addition to the history of oil change. The history of oil change includes the date and time when execution of the oil change is determined.

In step S218, the control unit 13 cuts off electric power to the controller 10, and ends the procedures in FIG. 2.

According to the operation procedures in FIG. 2, the controller 10 can determine the execution of oil change and store the history of oil change by detecting a decrease in remaining oil amount as the discharge indication event and an increase in remaining oil amount as the replenishment indication event. In short, it becomes possible to support management of the history of oil change without the need for additional component members for directly detecting one of oil discharge and oil replenishment. Moreover, the increase reference amount corresponding to the increase in remaining oil amount may be set higher than the decrease reference amount corresponding to the decrease in remaining oil amount. Accordingly, when it is detected that the remaining oil amount decreases below the decrease reference amount and then the remaining oil amount recovers to the increase reference amount or higher, an influence caused by error of the change of remaining oil amount attributed to external turbulence, or the like, can be eliminated, and thereby the execution of oil change can be determined more accurately. Moreover, when the elapsed time after the hood is opened and the controller 10 is started exceeds the reference elapsed time, there is a possibility that the hood is opened for any purpose other than oil change. However, even in such a case, it is possible to save electric power by causing the control unit 13 to execute step S218 in which electric power to the controller 10 is cut off when the elapsed time exceeds the reference time. Even when the elapsed time is within the reference time, execution of oil change may be determined, and the history of oil change may be stored. In such a case, it is also possible to save electric power by causing the control unit 13 to execute step S218 in which electric power to the controller 10 is cut off.

In the example shown in FIG. 2, when the hood is opened, electric power is supplied to the controller 10, and the operation procedures are started. However, for example, the controller 10 may be configured such that when the control unit 13 receives a signal indicating that the ignition is turned off via the communication unit 11, minimum required electric power is continuously provided to the controller 10 in accordance with the state of the vehicle 1 at the time. For example, when the control unit 13 receives information indicating engine friction from an engine management ECU via the communication unit 11, and the degree of the friction is large enough to indicate deterioration of engine oil, the control unit 13 performs control to continuously receive electric power supply. When the control unit 13 receives a travel distance from an ECU for controlling a travel distance meter via the communication unit 11, and the travel distance is long enough that oil change is recommended (e.g. 5000 km), the control unit 13 also performs control to continuously receive electric power supply. The control unit 13 also performs control to continuously receive electric power supply, when receiving via the communication unit 11 an alert indicating that the remaining oil amount is too small from an ECU for alert control of an engine oil system. Alternatively, when the control unit 13 derives its current position based on the GNSS signals received via the communication unit 11 and map information read from the storage unit 12, and the vehicle 1 is located in a service facility where vehicle maintenance is available, the control unit 13 performs control to continuously receive electric power supply. This makes it possible to bypass the electric power source circuit 14 that controls electric power supply in response to a signal from the hood sensor. In this case, step S200 is executed in response to, for example, ignition turned off.

First Modification

Figure 3:
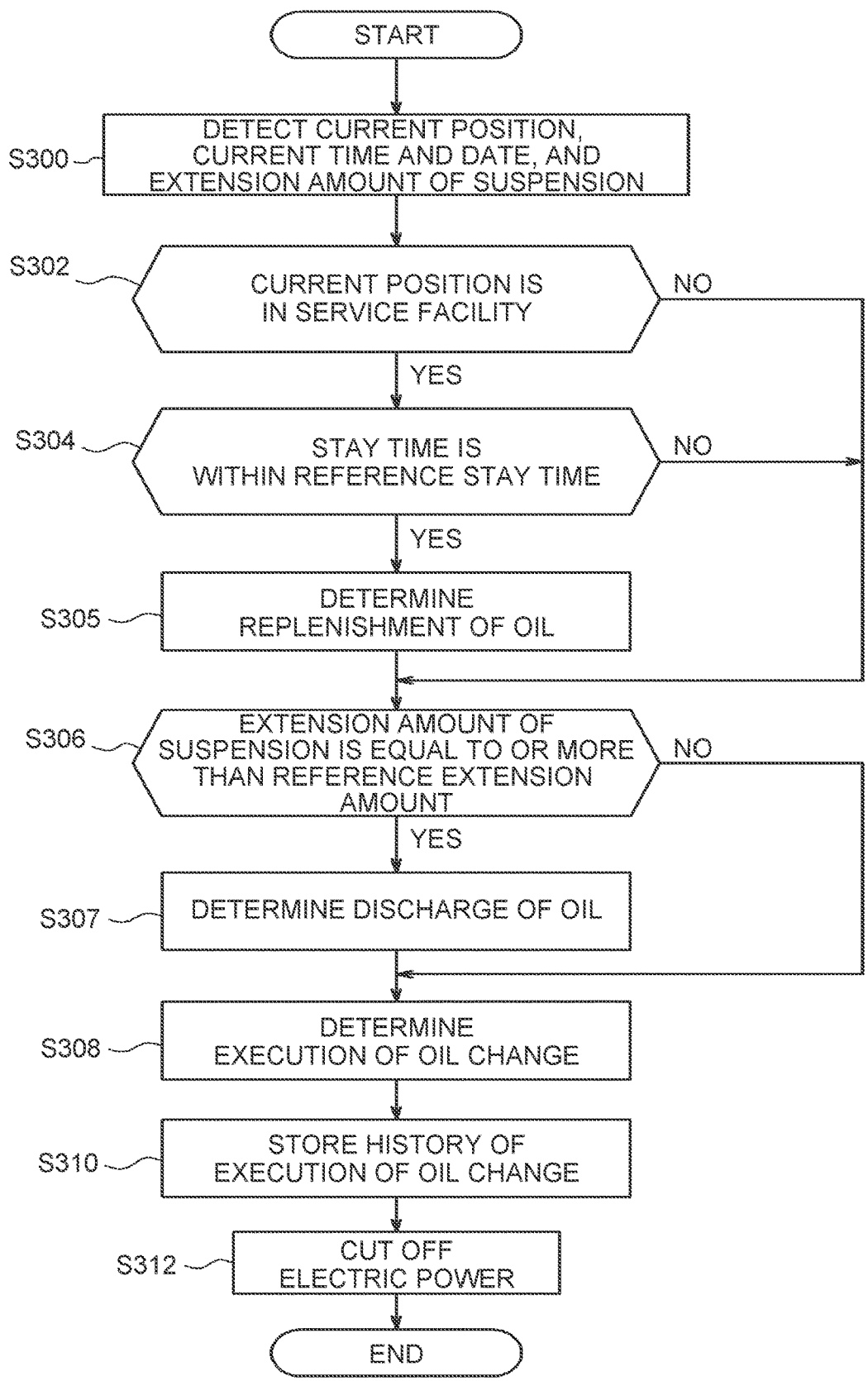
FIG. 3 is a flowchart describing an example of the operation procedures of the controller.

FIG. 3 is a flowchart describing an example of the operation procedures of the controller 10 in a first modification. The procedures in FIG. 3 is intended to be used in the case of executing oil change for the vehicle 1 at a sales agent of the vehicle 1 or a third party service facility. When oil change is executed at a service facility, the vehicle 1 is lifted up by a jack or other equipment, and a container is disposed under the body of the vehicle 1 for collecting the oil to be discharged. In this state, discharge of the oil is carried out. At the time, the weight of the vehicle 1 applied to the suspension of the vehicle 1 is temporarily reduced. Consequently, when the vehicle 1 is returned to the ground, the suspension is in a state of being partially extended. Therefore, the control unit 13 detects the extension of the suspension as the discharge indication event. The vehicle 1 staying at a service facility indicates that maintenance of the vehicle body is carried out. Here, the time required for oil change tends to be shorter than the time required for tire change, for example. Therefore, by using the typical time required for oil change as a reference stay time, execution of oil replenishment can be determined when the stay time is within the reference stay time, and execution of tire change or the like can be determined when the stay time exceeds the reference stay time. Accordingly, the control unit 13 detects staying at a service facility without exceeding the reference time as the replenishment indication event. Thus, in the first modification, the control unit 13 determines the execution of oil change by detecting extension of the suspension of the vehicle 1 as the discharge indication event, and detecting staying at a service facility without exceeding the reference stay time as the replenishment indication event.

The operation procedures in FIG. 3 is executed by the control unit 13 when the service facility finishes maintenance of the vehicle 1, the ignition is turned on, and electric power is supplied to the controller 10 to start the controller 10. When the vehicle 1 receives maintenance service at a service facility, the ignition is temporarily turned off. When receiving a signal indicating the ignition is turned off via the communication unit 11, the control unit 13 stores the current time and date in the storage unit 12 using a spare electric power source, and then ends the operation. Then, when the ignition is turned on and the controller 10 is started after the maintenance service is finished, the control unit 13 executes step S300.

In step S300, the control unit 13 detects the current position, current time and date, and the extension amount of the suspension. The control unit 13 receives GNSS signals from the communication unit 11, reads map information from the storage unit 12, and derives the current position using the GNSS signals and the map information. The control unit 13 also receives a detection result from a suspension sensor via the communication unit 11 to detect the extension amount of the suspension.

In step S302, the control unit 13 determines whether the current position is in a service facility. Information on service facilities where oil change is available is previously included in the map information. The control unit 13 determines whether the current position matches the position of a service facility. When the current position is in the service facility (Yes in step S302), the control unit 13 proceeds to step S304. When the current position is not in the service facility (No in step S302), the control unit 13 proceeds to S306 without executing steps S304, S305.

In step S304, the control unit 13 determines whether the stay time is within the reference time. The control unit 13 calculates the stay time by calculating a difference between ignition-off time stored in the storage unit 12 and the current time. The reference stay time is typically the time required for oil change. The reference stay time is optionally set (for example, 10 minutes to 20 minutes) and stored in the storage unit 12 in advance. The control unit 13 reads the reference stay time from the storage unit 12 and compares it with the calculated stay time. When the stay time is within the reference stay time (Yes in step S304), the control unit 13 proceeds to step S305. In step S305, the control unit 13 determines that oil is replenished, and proceeds to step S306. When the stay time exceeds the reference stay time (No in step S304), the control unit 13 proceeds to step S306 without executing step S305.

In step S306, the control unit 13 determines whether the extension amount of the suspension is equal to or more than a reference extension amount. The reference extension amount is the amount of extension that can be used to indicate that the vehicle body of the vehicle is once lifted up and then lowered to the ground based on a standard extension amount when the wheels of the vehicle 1 are on the ground. The reference extension amount is optionally set and stored in the storage unit 12 in advance. The control unit 13 reads the reference extension amount from the storage unit 12 and compares it with a detected extension amount of the suspension. When the extension amount of the suspension is equal to or more than the reference extension amount (Yes in step S306), the control unit 13 proceeds to step S307. In step S307, the control unit 13 determines that oil is discharged, and proceeds to step S308. When the extension amount of the suspension is less than the reference extension amount (No in step S306), the control unit 13 proceeds to step S308 without executing step S307.

In step S308, the control unit 13 determines execution of oil change when detecting, as the discharge indication event, that the suspension is extended beyond the reference extension amount or when detecting, as the replenishment indication event, that the vehicle 1 is staying at a service facility without exceeding the reference stay time. Alternatively, when both the discharge indication event and the replenishment indication event are detected, so that oil change is indicated with a higher probability than when each event is solely detected, the control unit 13 determines execution of oil change, and creates information that is weighted with certainty of the execution of oil change. Next, in step S310, the control unit 13 stores in the storage unit 12 the history of oil change, or information indicating the certainty in addition to the history of oil change.

In step S312, the control unit 13 cuts off electric power to the controller 10, and ends the procedures in FIG. 3.

According to the operation procedures in FIG. 3, the controller 10 detects extension of the suspension of the vehicle 1 as the discharge indication event, and detects staying at a service facility without exceeding the reference stay time as the replenishment indication event. This makes it possible to support management of the history of oil change without the need for additional component members for directly detecting one of oil discharge and oil replenishment.

Second Modification

In a second modification, instead of the extension of suspension in the first modification, the current date belonging to a reference period is determined as the discharge indication event. For example, the reference period is a period (for example, from April to October in Japan) when there is a low probability of needing to fit snow tires. The reference period is optionally set. When the current date belongs to the reference period, there is a high probability that the purpose of staying at a service facility is oil change including oil replenishment. When the current date does not belong to the reference period, there is a high probability that the purpose of staying at the service facility is to change normal tires to snow tires. Therefore, in the second modification, the control unit 13 determines that the current date belongs to the reference period as the discharge indication event.

Figure 4:
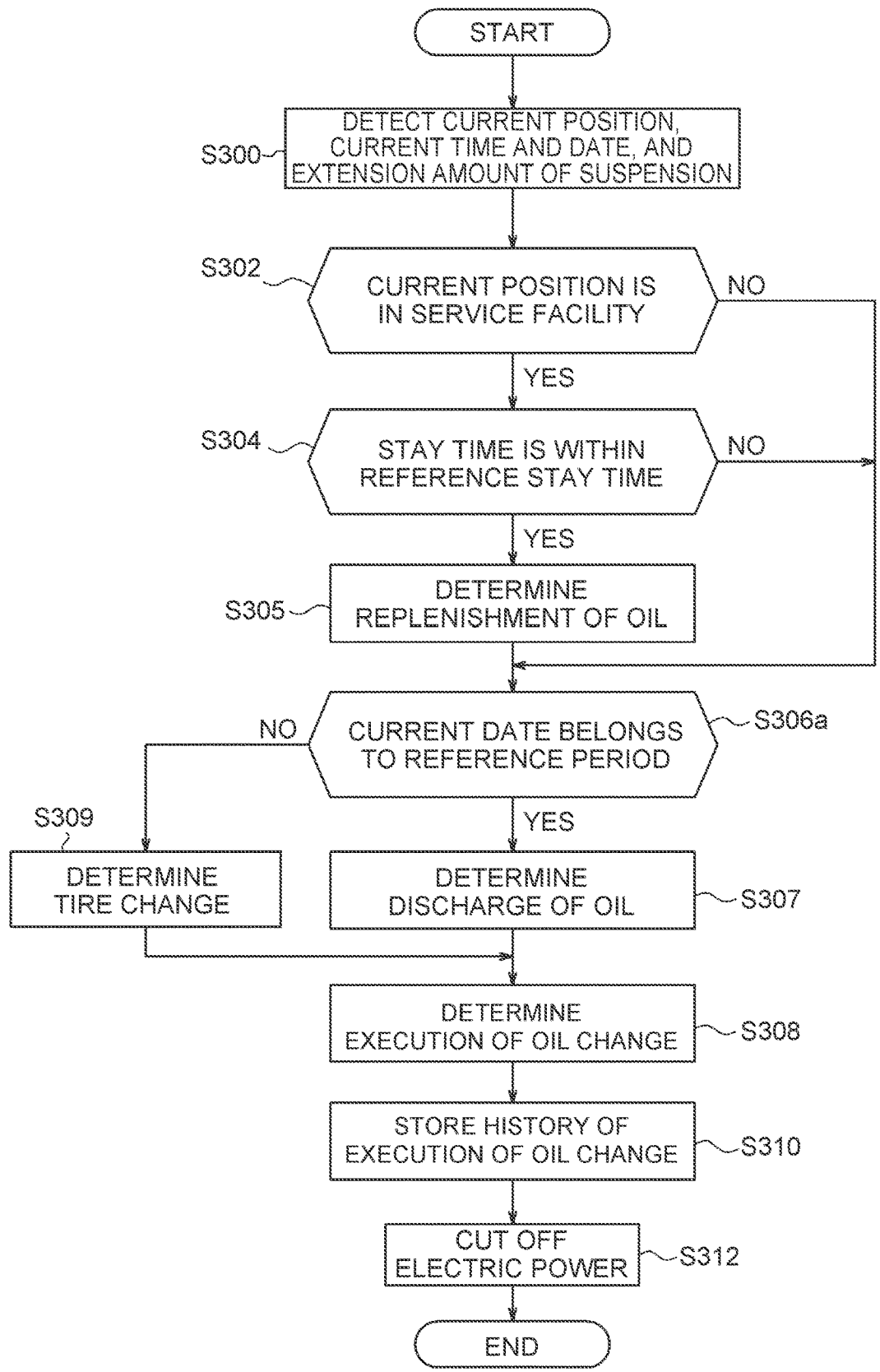
FIG. 4 is a flowchart describing an example of the operation procedures of the controller.

FIG. 4 is a flowchart describing an example of the operation procedures of the controller 10 in the second modification. The procedures in FIG. 4 is intended to be used in the case of executing oil change for the vehicle 1 at a sales agent of the vehicle 1 or a third party service facility. The steps identical to the procedures in FIG. 3 are denoted by identical signs. In FIG. 4, in place of step S306 in FIG. 3, step S306a is executed after step S305. In FIG. 4, step S309 is added.

In step S306a, the control unit 13 determines whether the current date belongs to a reference period. The reference period is optionally set and stored in the storage unit 12 in advance. The control unit 13 reads the reference period from the storage unit 12. When the current date belongs to the reference period (Yes in step S306a), the control unit 13 proceeds to step S307. The procedures subsequent to step S307 are the same as the procedures in FIG. 3. When the current date does not belong to the reference period (No in step S306a), that is, when there is a high probability that the purpose of staying at a service station is to change normal tires to snow tires, the control unit 13 determines execution of tire change in step S309, and proceeds to step S308.

According to the operation procedures in FIG. 4, the controller 10 detects, as the discharge indication event, that the current date belongs to the reference period and the vehicle 1 is staying at a service facility for replenishment of oil rather than for tire change and detects, as the replenishment indication event, that the vehicle 1 is staying at the service facility without exceeding the reference stay time. This makes it possible to support management of the history of oil change without the need for additional component members for directly detecting one of discharge of oil and replenishment of oil.

Third Modification

When the user of the vehicle 1 desires to know the travel distance subsequent to oil change, the trip meter of the vehicle 1 may be cleared and reset when oil change for the vehicle 1 is executed. When the trip meter clear and oil change are carried out in association with each other with the certainty of a certain degree or more, it is possible to determine that oil change is executed when the trip meter is cleared. In the controller 10 in the third modification, the storage unit 12 stores a history of trip meter clear when the trip meter of the vehicle is cleared, together with the history of oil change. When the trip meter clear is detected, and the history of the trip meter clear is associated with the history of oil change at a reference frequency or more in the past, the control unit 13 determines execution of oil change even without detection of the discharge indication event and the replenishment indication event.

Figure 5:
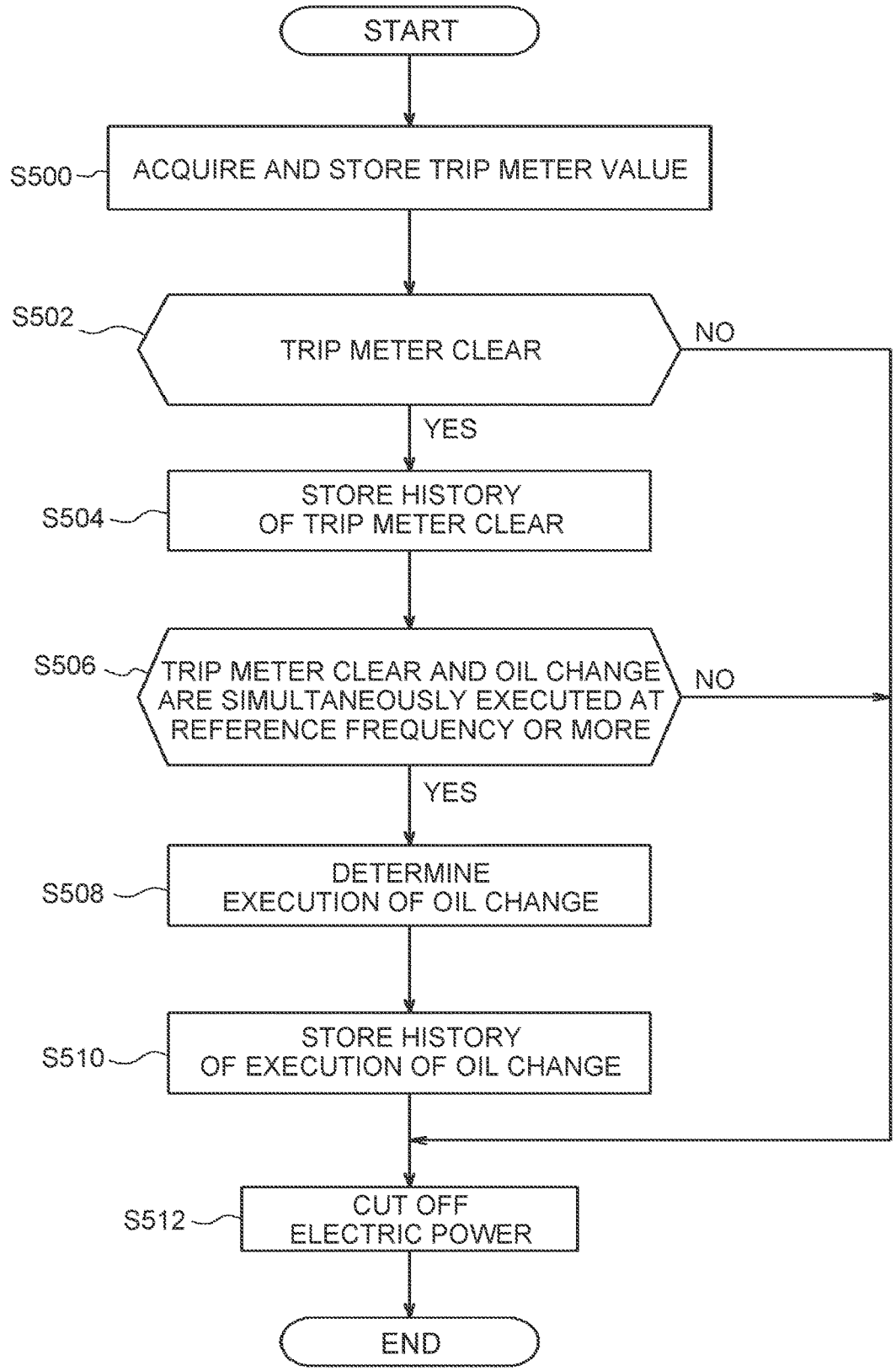
FIG. 5 is a flowchart describing an example of the operation procedures of the controller.

FIG. 5 is a flowchart describing an example of the operation procedures of the controller 10 in a third modification. For example, the control unit 13 executes the procedures at any interval (every few seconds to several hours).

In step S500, the control unit 13 acquires a trip meter value, and stores it in the storage unit 12. For example, the control unit 13 receives a current trip meter value at the point of time from the trip meter or a drive control ECU via the communication unit 11. The control unit 13 stores the received trip meter value in the storage unit 12.

In step S502, the control unit 13 determines whether the trip meter is cleared. The control unit 13 reads a recent past trip meter value from the storage unit 12 and compares it with the trip meter value acquired in step S500. The control unit 13 determines that the trip meter is cleared when the acquired trip meter value is zero or less than the recent trip meter value. When the trip meter is cleared (Yes in step S502), the control unit 13 proceeds to step S504 and stores a history of trip meter clear in the storage unit 12. The history of trip meter clear includes, for example, the date and time when the trip meter clear is determined. When the trip meter is not reset (No in step S502), the control unit 13 proceeds to step S512. In step S512, the control unit 13 cuts off electric power to the controller 10, and ends the procedures in FIG. 5.

In step S506, the control unit 13 determines whether simultaneous execution of the trip meter clear and oil change is performed at a reference frequency or more. Here, the simultaneous execution induces execution of the trip meter clear and oil change on the same date. The frequency is, for example, a ratio of the number of simultaneous execution to the number of execution of oil change. The control unit 13 reads the history of trip meter clear and the history of oil change in the past from the storage unit 12, and counts the number of simultaneous execution of the trip meter clear and oil change on the same date. The control unit 13 then calculates the frequency of the simultaneous execution, and compares the frequency of the simultaneous execution with a reference frequency. The reference frequency is the frequency (e.g. 90% or higher) based on which execution of oil change can be determined with a sufficient certainty when the trip meter clear is performed. When the frequency of the simultaneous execution is equal to or more than the reference frequency (Yes in step S506), the control unit 13 proceeds to step S508 to determine execution of oil change. Then, in step S510, the control unit 13 stores the history of oil change in the storage unit 12. When the frequency of simultaneous execution is less than the reference frequency (No in step S506), the control unit 13 proceeds to step S512 to cut off electric power to the controller 10, and ends the procedures in FIG. 5.

According to the operation procedures in FIG. 5, the controller 10 can determine the execution of oil change without detecting the discharge indication event and the replenishment indication event.

Fourth Modification

According to the operation procedures in FIG. 2, the controller 10 detects a decrease in remaining oil amount as the discharge indication event, and detects an increase after a decrease in remaining oil amount as the replenishment indication event. Therefore, the controller 10 determine the execution of oil change based on detection of a relatively direct event such as increase or decrease of the remaining oil amount. On the contrary, in the first to third modifications shown in FIGS. 3 to 5, the controller 10 determines oil change based on a relatively indirect event as compared with the increase or decrease in remaining oil amount. Therefore, when the procedures in FIG. 2 is compared with the procedures in FIGS. 3 to 5, there is a difference in certainty of determination regarding oil change. In a fourth modification, the certainty of determination regarding oil change is enhanced by combing the procedures in FIGS. 3 to 5.

Figure 6:
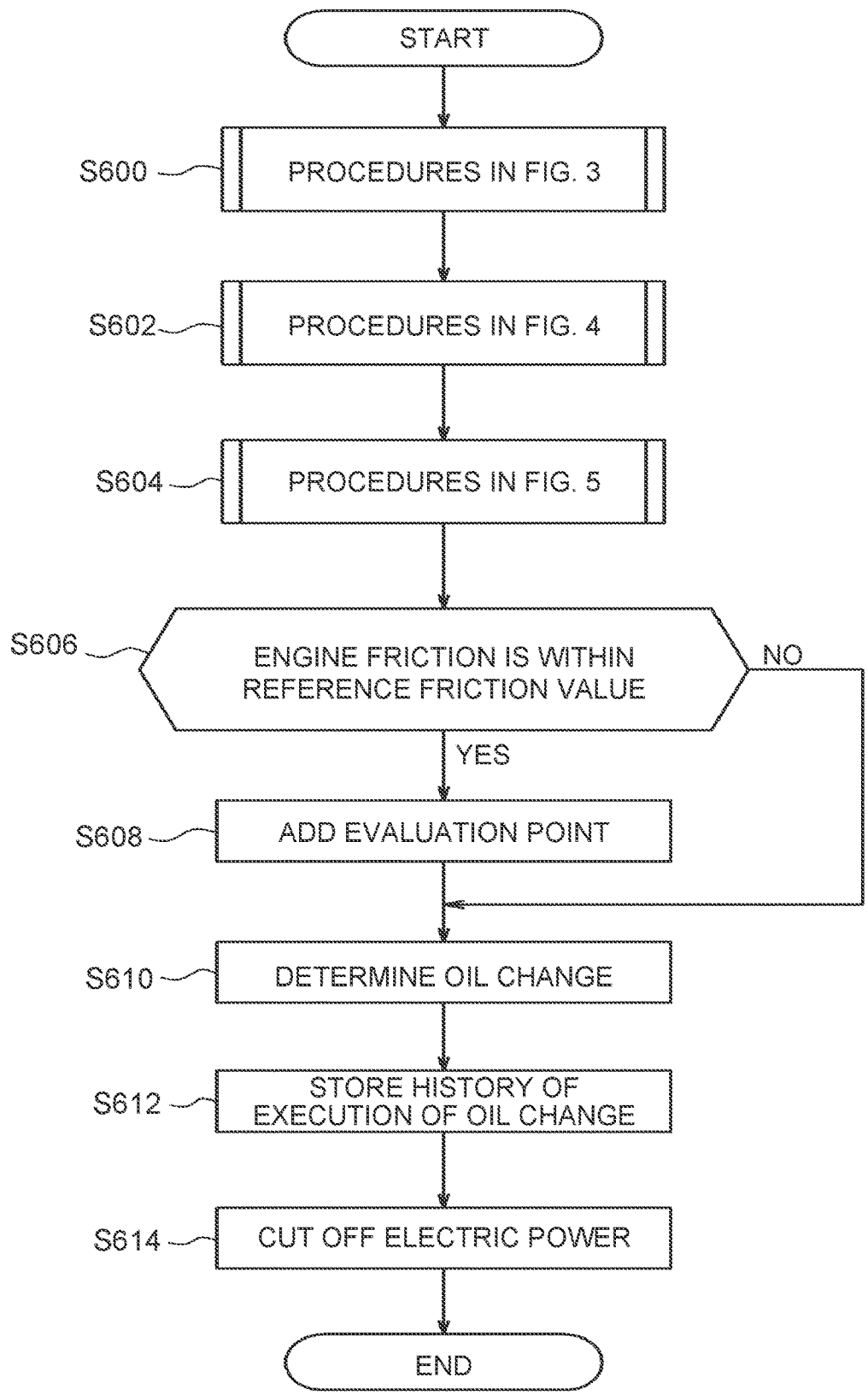
FIG. 6 is a flowchart describing an example of the operation procedures of the controller.

The procedures in FIG. 6 are a combination of the procedures in FIGS. 3 to 5. Subroutines in steps S600, S602, S604 correspond to the procedures in FIGS. 3 to 5, respectively. However, in each of steps S308 in FIGS. 3 and 4 and step S508 in FIG. 5, the control unit 13 adds an evaluation point indicating the certainty of oil change instead of determining the oil change. The evaluation point is any discrete number. In each of steps S308 in FIGS. 3 and 4 and step S508 in FIG. 5, the evaluation points may be different in magnitude. Furthermore, in step S508, the control unit 13 may add an evaluation point the magnitude of which corresponds to the frequency of simultaneous execution of trip meter clear and oil change.

The control unit 13 executes steps S600, S602, S604 in sequence. Furthermore in step S606, the control unit 13 determines whether the magnitude of engine friction is within a reference friction value. When the vehicle 1 is a hybrid vehicle, the control unit 13 acquires information indicating the magnitude of torque from the engine control ECU via the communication unit 11, and calculates the engine friction from the magnitude of torque. The engine friction is small when the engine oil is fresh. The reference value is set to any friction value when oil change is executed and the engine is filled with new engine oil. The reference value is stored in the storage unit 12 in advance. The control unit 13 reads a reference friction value from the storage unit 12, and compares it with the detected engine friction. When the engine friction is within the reference friction value (Yes in step S606), the control unit 13 proceeds to step S608 to add an evaluation point indicating the certainty of oil change. When the engine friction exceeds the reference friction value (No in step S606), the control unit 13 omits step S608.

In step S610, the control unit 13 determines execution of oil change based on the evaluation point. For example, the control unit 13 determines that oil change is executed when a sum of the added evaluation points exceeds a preset reference evaluation point, and when the sum of the added evaluation points is equal to or less than the reference evaluation point, the control unit 13 determines that oil change is not executed. Alternatively, the control unit 13 may determine execution of oil change with information indicating the certainty corresponding to the evaluation point. For example, the evaluation points may be ranked into A, B, C in order of certainty, and execution of oil change is determined with reservation by ranking. Then, in step S612, the control unit 13 stores the history of oil change in the storage unit 12.

In step S614, the control unit 13 cuts off electric power to the controller 10, and ends the procedures in FIG. 6.

In FIG. 6, steps S600, S602, S604, S606 are exemplary. It is possible to execute one or more of the steps in any order. In addition to the above description, the procedures shown in FIGS. 2 to 5 can be executed in any appropriate combination, or can be executed with the order of the steps in the respective procedures being changed.

According to the procedures shown in FIG. 6, it is possible to enhance the certainty of oil change determination even when the oil change is determined based on a relatively indirect event.

In the embodiments disclosed, the history of oil change stored in the storage unit 12, or information indicating the certainty of the execution of oil change in addition to the history of oil change, can be read as appropriate using any user interface. For example, the user can read the history of oil change from the storage unit 12 of the controller 10 via the in-vehicle network of the vehicle 1 by operating a terminal device that can be connected to the in-vehicle network. When the controller 10 is constituted of a navigation device or other information processing devices including a user interface, the user can read the history of oil change from the storage unit 12 attached thereto by operating the user interface of the information processing device. Alternatively, a cloud server may be configured to include part of the storage unit 12. In this case, the control unit 13 of the controller 10 sends the history of oil change or the like to the cloud server via the communication unit 11, and the history is centrally stored on the cloud server. The user can read the history of oil change from the cloud server by operating an information processing device such as personal computers connected to the cloud server via the network.

Processing and control programs are commands that define the operation of the controller 10 and cause the controller 10 to execute control and processing functions. The processing and control programs may be stored in the storage unit of any server device and be downloaded to the controller 10, or may be stored in a portable, non-transitory recording and storage medium that is readable by the controller 10, and the controller 10 may read them from the medium.

While the embodiments have been described based on drawings and embodiments in the foregoing, it is to be understood that those skilled in the art can easily make various transformations and corrections based on the present disclosure. Therefore, it is to be noted that these transformations and corrections are intended to be embraced in the range of the present disclosure. For example, the functions, or the like, included in each means, step, or the like, can be rearranged without causing logical inconsistency, and a plurality of means, steps, or the like, can be integrated into unity or can be divided.

What is claimed is:

1. A controller comprising:
    a control unit including circuitry configured to detect, based on information from a sensor mounted on a vehicle, a first event indicating that engine oil is discharged from an engine of the vehicle, or a second event indicating that the engine is replenished with engine oil; and
    a memory configured to store a result of detection by the control unit as a history of oil change,
    wherein the memory is configured to store a history of trip meter clear when a trip meter of the vehicle is cleared, together with the history of the oil change; and
    the control unit is configured to store the history of the oil change in the storage unit even without detection of the first event or the second event, when the trip meter clear is detected and the history of the trip meter clear is associated with the history of the oil change at a reference frequency or more in the past.

2. The controller according to claim 1, wherein:
    the first event includes a decrease in amount of the engine oil; and
    the second event includes an increase in amount of the engine oil.

3. The controller according to claim 2, wherein:
    the controller is started when a hood of the vehicle is opened; and
    the control unit is configured to, when reference elapsed time elapses after the controller is started, cut off electric power to the controller even without detection of the first event or the second event.

4. The controller according to claim 3, wherein:
    the second event includes an increase after a decrease in amount of the engine oil; and
    the control unit is configured to, when the second event is detected, store information indicating certainty of the history of oil change in the storage unit.

5. The controller according to claim 4, wherein:
    the decrease in amount of the engine oil in the first event is on condition that the amount of the engine oil becomes equal to or less than a first reference amount; and
    the increase in amount of the engine oil in the second event is on condition that the amount of the engine oil becomes equal to or more than a second reference amount.

6. The controller according to claim 5, wherein the second reference amount is greater than the first reference amount.

7. The controller according to claim 1, wherein:
    the first event includes that an extension amount of a suspension when an ignition of the vehicle is turned on is equal to or more than a reference extension amount; and
    the second event includes that the vehicle stays at a prescribed place without exceeding a reference stay time.

8. The controller according to claim 1, wherein:
    the first event includes that current date and time belong to a reference period; and the second event includes that the vehicle stays at a prescribed place without exceeding a reference stay time.

9. A vehicle, comprising the controller according to claim 1.

10. A non-transitory storage medium for storing commands that are executable by one or more processors and that cause the one or more processors to perform functions comprising causing a computer to operate as the controller according to claim 1.

11. An operation method of a controller, comprising:
receiving information from devices including a sensor mounted on a vehicle;
detecting, based on the information, a first event indicating that engine oil is discharged from an engine of the vehicle, or a second event indicating that the engine is replenished with engine oil;
determining execution of an oil change based on a result of the detecting;
storing a history of the execution of the oil change;
acquiring a value of a trip meter of the vehicle and storing the value of the trip meter of the vehicle;
determining whether the trip meter of the vehicle is cleared;
storing a history of trip meter clear when the trip meter of the vehicle is cleared;
determining a frequency of performance of simultaneous execution of the trip meter clear and oil change based on the history of the trip meter clear and the history of execution of the oil change; and
determining the execution of the oil change and storing the history of the execution of the oil change when the trip meter clear is detected and the determined frequency of the performance of the simultaneous execution of the trip meter clear and oil change is greater than or equal to a reference frequency.

12. The operation method according to claim 11, wherein:
the first event includes a decrease in amount of the engine oil; and
the second event includes an increase in amount of the engine oil.

13. The operation method according to claim 12, further comprising:
starting the controller when a hood of the vehicle is opened; and
cutting off, when reference elapsed time elapses after the controller is started, electric power to the controller even without detection of the first event or the second event.

14. The operation method according to claim 13, wherein:
the second event includes an increase after a decrease in amount of the engine oil; and
when the second event is detected, the operation method further includes storing information indicating certainty of the history of the oil change.

15. The operation method according to claim 12, wherein:
the decrease in amount of the engine oil in the first event is on condition that the amount of the engine oil becomes equal to or less than a first reference amount; and
the increase in amount of the engine oil in the second event is on condition that the amount of the engine oil becomes equal to or more than a second reference amount.

16. The operation method according to claim 15, wherein the second reference amount is greater than the first reference amount.

17. The operation method according to claim 11, wherein:
the first event includes that an extension amount of a suspension when an ignition of the vehicle is turned on is equal to or more than a reference extension amount; and
the second event includes that the vehicle stays at a prescribed place without exceeding a reference stay time.

18. The operation method according to claim 11, wherein:
the first event includes that current date and time belong to a reference period; and
the second event includes that the vehicle stays at a prescribed place without exceeding a reference stay time.

* * * * *